Feb. 14, 1950     H. M. COLLINS     2,497,346
COLORING METHOD FOR PLASTICS
Filed Oct. 29, 1946
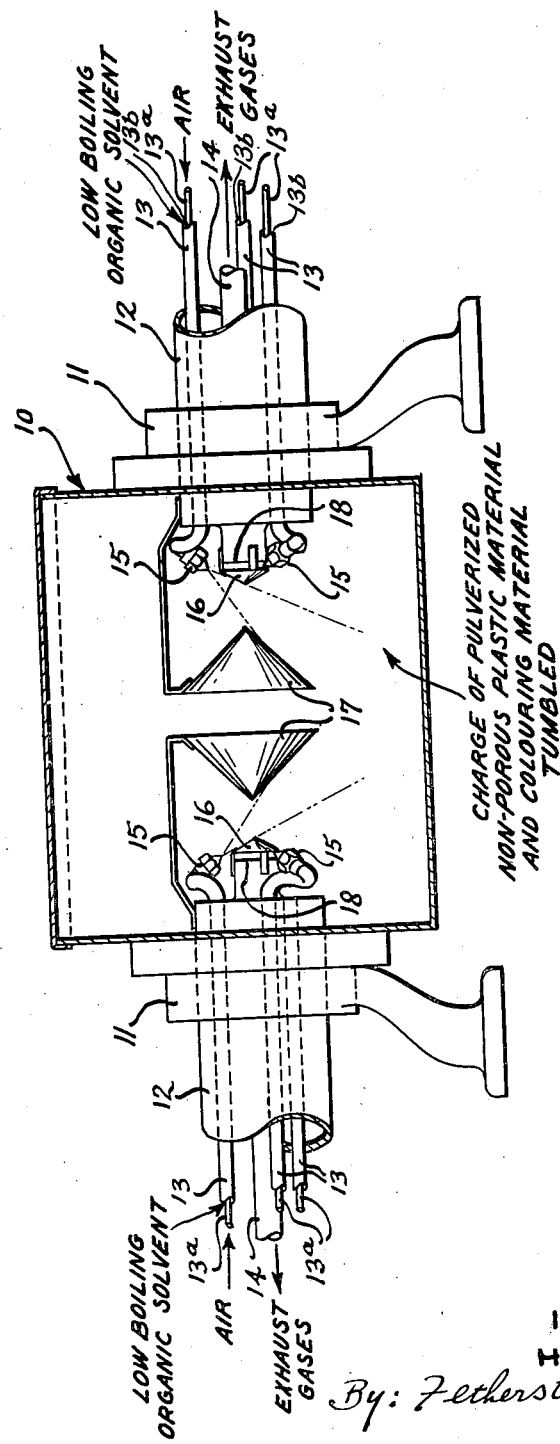
INVENTOR
H. M. COLLINS
By: Fetherstonhaugh & Co.
ATT'YS Patented Feb. 14, 1950

2,497,346

UNITED STATES PATENT OFFICE 2,497,346

COLORING METHOD FOR PLASTICS

Henry M. Collins, Vaughan, Ontario, Canada, assignor to Reliable Plastics Company, Limited, Toronto, Ontario, Canada Application October 29, 1946, Serial No. 706,388

3 Claims. (Cl. 106—198)

This invention relates to a method of adding and incorporating colouring materials to non-porous plastic materials soluble or softenable by low boiling point organic liquids.

By "colouring materials" is meant, any materials which are added to plastics for the purposes of colouring, rendering opaque or rendering translucent the final plastic materials and this term is meant to include such colours as the dyes and pigments themselves, the opacifying agents themselves and any mixtures of dyes, pigments and opacifying agents which may be added to impart special colouring or toning characteristics to the final plastic product. By "non-porous plastic materials" is meant all types of plastic materials which are non-porous in character when they are in finely divided form prior to a forming operation which may be performed upon them to produce plastic products, and by "low boiling point organic liquids" is meant all liquids which may be classed as organic compounds and whose boiling points at normal pressure are below 200° F. approximately.

The above definitions are given by way of explanation and to avoid confusion in the following specification and it is desired that these meanings will be given to the above terms wherever they occur within the body of the following specification and claims.

Heretofore, it has been the general practice to colour, tint or opacify thermoplastic moulding powders which are capable of being used in compounded form in standard injection moulding machines, by means of organic and inorganic dyes, pigments and so forth and to add these substances to the plastic mass during a milling or "sheeting" process which is carried out on polished steel milling rolls, or in the type of equipment known as a "Banbury" mixer. This process is comparable to the kneading of dough, the heat of the rollers causing softening of the plastic until it is possible to knead the dyes and pigments into the mass in much the same way that flour is kneaded into bread dough. This process is necessarily cumbersome and slow in comparison with most mass production methods, but heretofore it has been the only known method of thoroughly mixing the plastic mass and colouring material sufficiently intimately to ensure a clear, uniformly coloured moulded product, free from blemishes and faults.

Another known method that is very restricted in scope entails the addition of colouring materials to the monomeric charge before the plastic is polymerized. This method is practical, however, only in certain specific cases, because of the fact that most colouring materials have a depressing action upon the polymerization of plastic monomers and it has in most cases been found impossible to achieve satisfactory polymeric products by the use of this method.

Various suggestions have been made for eliminating the necessity of the above mentioned milling process, which is, although effective, relatively costly, requires cumbersome equipment, and might be represented as forming a bottleneck in the preparation of finished thermoplastic moulding powders, and the operation of milling represents a relatively large percent of the cost of the finished moulding powder.

It has been suggested, for instance, to grind the plastic material to a fine mesh, add an excess of powdered dye and other powdered colouring materials to the finely divided charge and to mix the whole mass in a tumbler. In this manner the fine particles of added colour become evenly distributed over the surfaces of the finely divided particles of plastic material. The action of tumbling builds up an electrostatic charge on the plastic particles causing a very strong adherence and an even distribution of the colouring agent over the surface of the particles. Products moulded from powder prepared in this manner, however, are dull in appearance, show streaks, and are in general quite inferior to plastic items prepared by the milling process.

Another suggested method of overcoming the difficulty was to first dissolve or disperse the colouring agent in a mixture of low boiling organic liquids, and then to add the resulting solution or dispersion to the plastic. This suggestion, however, proved unfeasible since in order to bleed or dissolve the organic dye portion of the colour charge, fairly high boiling point solvents were necessary and the inorganic portion of the charge, of course, could only be dispersed and not dissolved by the use of such solvents. Furthermore, the length of time and heating necessary to drive off a sufficient quantity of the solvents used from the finished moulding powder was found to more than make up for the time and labour saved in the elimination of the milling process. A further difficulty encountered in the putting into practice of this suggestion was the difficulty of spraying the dissolved colour charge into the tumbling mass of fine ground plastic particles. It was found that the inorganic and/or dispersed parts of the colouring material, since it was not completely dissolved in the solvent, would lodge in the jets and block the spray equipment and that the rate of spraying had therefore to be very carefully controlled and a frequent cleaning of the liquid lines and jets was necessary. Finally the results achieved, although better than those obtained according to the first suggested method, were hardly comparable to those obtainable from the already mentioned milling process.

I have now found that all the above mentioned difficulties may be overcome in a surprisingly simple, novel, efficient and unexpected manner, by finely pulverizing the moulding material and forming a substantially homogeneous mixture of said material with finely divided colouring material, to obtain a mass of similar characteristics to that mentioned in the first suggestion above. This mass is agitated and a finely divided spray of liquid, having a relatively low boiling point and and at least some solvent power for the plastic material itself and preferably but not necessarily solvent power for the organic colouring material present, is injected over a relatively short period of time and the whole resultant mass is then subjected to an agitation in the presence of a stream of hot air or non-reactive gas to evaporate the solvent. A coloured moulding material results which produces moulded products having colour properties at least as good as those produced when using moulding powders prepared by the milling process. Where the liquid also has a solvent action on the colouring material, a very intimate thoroughly tinted moulding powder results and the colouring material permeates the moulded plastic article to form a substantially homogeneous coloured moulding. When the liquid has only an action on the plastic a somewhat longer processing is required for equivalent results. Agitation of the charge during the process besides ensuring a complete treatment of all the particles in the charge, prevents any tendency to form cakes or lumps while the plastic particles are in a softened state, and preserves the free flowing characteristics necessary in using the product as a moulding powder.

The effect on the individual particles seems to be that a softening of those particles, for which the introduced liquid has a softening power, occurs. Where only the plastic particles are softened, a bleeding of the particle to partly envelope the surrounding colour particles occurs, which, on removal of the liquid, leaves the plastic and colour particles in firm adherence. Where both particles are softened, there is an inter-diffusion between the particles, and a much firmer and more complete bond unites the particles on evaporation of the liquid. Since the liquid is injected in finely divided form, usually in a gas stream, and a constant agitation is carried out, there is never more liquid present than is just required to effect the above process of softening and adherence or inter-diffusion, (which process will be hereinafter referred to as "inter-adhesion"). The subsequent drying operation removes the solvent before any consolidation of the plastic particles can occur, and it is a simple matter to determine in any specific case just how long to continue the treatment to obtain the best results. Suitable times of treatment for some of the commoner types of plastic are indicated in the examples given below. The details concerning the injection of fluid is expressed in terms of time of treatment rather than in quantity of liquid added because in apparatus particularly of the type described in my co-pending application Serial No. 687,302, filed July 31, 1946, it is generally not easy to measure the actual amount of liquid added since the apparatus is connected directly to the bulk supply, and the actual amount required will vary according to other conditions such as temperature and air jet velocity. In any case the liquid, being transient to the moulding compositions, need not be accurately measured. Since the heat lost in vapourizing the solvent constitutes an operating expense, it will in all cases be desirable to use as little liquid as possible and once again just how little may be used is a thing which must be determined in any given case by actual experience.

Suitable apparatus for carrying out this process is described in co-pending application Serial No. 687,302 filed July 31, 1946, and consists of a tumbler equipped with an especially designed injector whereby it is possible to inject a stream of gas or liquid or mixtures of gas and liquid into finely divided powders while at the same time providing for the escape of exhaust gases without allowing escape of the powder charge. While this type of apparatus is particularly desirable for the purpose of the present invention, any apparatus which provides for agitation of the charge, injection of atomized spray, and exhaustion of excess gases without involving substantial losses of the powder charge will be suitable.

The degree of fineness of the moulding powder for purposes of the invention has a large bearing on the final result achieved because the fact is the finer the grind, the more completely even a final colour is obtained. However, for the purpose of economy it is preferable to form a balance between the fineness of grind and shortness of the process time and grinding time. For economical results, I prefer to use a grind which is somewhere between 20 and 100 mesh.

Suitable temperatures for the removal of the organic liquid will of course vary depending on the type of plastic used, the volatility of the organic liquid used, and the economic balance between length of time available for the process and the cost of producing gases of higher temperature for the purpose. I have generally found that somewhere between the range of 250° and 400° F. is suitable, but in special cases temperatures outside this range are desirable.

The dry coloured charge produced by the above process is ideal for moulding purposes and the colour cannot to any extent be mechanically removed from the particles. The range of colours possible is limited only by the colouring materials available and may be accurately controlled to reproduce any colour or hue or depth of shade, within very accurate limits.

Whereas the above process is applicable to any nonporous plastic moulding powder which is at least partially soluble in a low boiling point organic solvent, it has been found particularly adapted to use in the colouring of the following materials: polystyrene polymethyl methacrylate, polymethylacrylate, polyvinyl chloride-acetate, polyvinyl acetate, polyvinyl acetals, cellulose acetate, ethyl cellulose, and polyethylene.

Dyes which may be used are almost without limit but the most effective ones including pigments are the heat stable, neutral, complex, organic, high tinting types normally found in the following classes:

| | |
|---|---|
| Phthalocyanine | Green and blue |
| Hansa and benzidine types | Yellow |
| Lithol-rubine, calcium lakes, toluidine base dyes, barium toners and lakes | Red | and all the intermediate colours. The only requirements are that the dye must be heat stable, non-reactive and of good tinting and colouring power. A very large number of the vat type substantive dyes are also suitable.

It may frequently be desirable to mix an opacifying agent with the dyes in order to render the product translucent or opaque. These materials may include a high hiding power white such as titanium oxide, although any other high hiding power white of similar chemical neutrality is equally satisfactory.

The low boiling organic liquids injected into the coloured mass will of course vary depending upon the particular plastic moulding powder in use and the solubility characteristics of the dye stuff. Generally speaking, I have found that for most purposes a mixture of methyl alcohol and methyl acetate ranging between 20 and 80% methyl alcohol, and mixtures of methyl alcohol and methyl-ethylketone are particularly suitable when using the more common types of moulding materials. Generally speaking, the only qualification necessary for such solvents are that they have at least some dissolving power or softening power with respect to the plastic material being used. Choice of a particular solvent will generally depend on availability and cost.

My invention will be more fully understood from the following detailed description with reference to the accompanying drawing which illustrates one embodiment of an apparatus particularly adapted for the carrying out of my process. The apparatus, which is fully described in the above mentioned previous application, consists essentially of a tumbler 10 which is rotatably mounted about massive bushings 11, and rotatable by suitable power means (not shown). Passing through the centre of the bushings 11 and protruding into the interior of the tumbler 10 are tubular members 12 which house a series of double concentric pipes 13, and exhaust pipes 14. The tubular members terminate in a series of spray nozzles 15, which are adapted to project a fine spray of gas borne atomized liquid into the tumbler 10. Shields 16 and 17 control the shape of the jets, and exhaust gases enter the exhaust pipes 14 through exhaust ports 18.

To carry out the process according to my invention using the above apparatus, a mixture of finely pulverized plastic moulding powder and powdered colouring material with or without added opacifying agents, which has been intimately mixed in a previous operation, such as by tumbling, is introduced into the tumbler 10, and the tumbler is set in motion. A finely divided atomized spray of low boiling organic liquid or mixture of liquids is introduced into the tumbler 10 by the nozzles 15. In this connection the tubular members 13 include the pipe members 13a through which compressed air may be passed to the nozzles 15 and which run concentrically inside the tubular members 13 to define an annular space 13b through which the liquid may be passed.

The tumbling operation plus the action of the jets of spray, causes a violent agitation of the mass of plastic particles and the organic liquid droplets act on the particles of plastic and their adhering particles of colouring material in the manner described above. The excess air escapes through exhaust ports 18 to exhaust pipe 14 and the escape of particles of plastic etc. is prevented by the action of the jets of spray as described in the above mentioned copending application.

When all the liquid has been added, hot air or other hot gases is introduced through nozzles 15 by way of each annular space or passage 13b until the organic liquid has been completely evaporated. The solvent may be recovered by connecting the exhaust pipes 14 to a condenser, and a heat exchanger may be installed to recover the latent heat of evaporation.

The dry powder remaining in the tumbler 10 is evenly coloured and free flowing, and will produce coloured moulded products of a character as good as or superior to products made from milled moulding powders.

Relative amounts of the various materials used, may be slightly in excess of that used in the milling process, and the length of time for the various operations depends on the solvents used and the temperature of the gases used for evaporation purposes.

The following chart is given as an indication of suitable operating quantities and times for producing coloured moulding powders from several of the more common varieties of plastics, and in some of the more common colours. The list is not intended to be in any manner exhaustive or limitative, and is given for purposes of illustration only. It is a simple matter for an experienced operator to determine from experiment in conformity with the examples described, ideal times of operation under any given conditions for other cases outside the specific ones shown.

*Example I*

| Colour Charge, Parts per 100 parts plastic | Spray | | Solvent. Composition | Drying | | Remarks |
|---|---|---|---|---|---|---|
| | Time | Temp. | | Time | Temp. | |
| | *Minutes* | °F. | | *Minutes* | °F. | |
| 0.075 part phthalocyanine blue, 0.2 part Titanium Dioxide, 0.2 part Zinc Stearate. | 10 | 100 | 1:3 methylacetate: methanol. | 15 | 350 | Clean, free-flowing, colour well-secured. |
| 0.05 part Phthalocyanine green, 0.2 part Medium Chrome Green, 0.1 part Hansa Yellow, 0.2 part Titanium Dioxide, 0.2 part Zinc Stearate. | 10 | 100 | do | 15 | 350 | Do. |
| 0.07 part Calco Condensation Orange, 0.02 part Lithol Rubine Red, 0.2 part Titanium Dioxide, 0.2 part Zinc Stearate. | 10 | 100 | do | 15 | 350 | Do. |
| 0.08 part benzidine yellow, 0.2 part Titanium Dioxide, 0.2 part Zinc Stearate. | 10 | 100 | do | 15 | 350 | Do. |

Finely divided 20–80 mesh polystyrene was tumbled for 35 minutes in a conventional barrel tumbler at a rate of 23–27 R. P. M. with well mixed, cosmetic grind dye shot in the proportion mentioned above and was treated by the process according to the invention according to the times and temperatures indicated.

Example II

Finely divided 20–100 mesh cellulose acetate M. S. flow, crystal moulding powder was used and the resulting mass was treated according to the invention as indicated below:

| Colour Charge, Parts per 100 parts plastic | Spray | | Solvent, Composition | Drying | | Remarks |
|---|---|---|---|---|---|---|
| | Time | Temp. | | Time | Temp. | |
| Same as Example I | Minutes 10 | °F. 140 | 3:1 Methanol: Acetone | Minutes 32 | °F. 300 | Clean, free-flowing; Colour brilliant, even and true. |

Example III

Finely divided 20–90 mesh green ethyl cellulose, M. S. flow moulding powder was used and the resulting mass was treated according to the invention as indicated below:

| Colour Charge, Parts per 100 parts plastic | Spray | | Solvent, Composition | Drying | | Remarks |
|---|---|---|---|---|---|---|
| | Time | Temp. | | Time | Temp. | |
| Same as Example I | Minutes 11 | °F. 175 | 2:1 Methanol: Methyl Acetate. | Minutes 13 | °F. 400 | Clean and Free-Flowing; Colour, excellent. |

Example IV

Finely divided 20–80 mesh polystyrene was used and the resulting mass was treated according to the invention as indicated below:

| Colour Charge, Parts per 100 parts plastic | Spray | | Solvent, Composition | Drying | | Remarks |
|---|---|---|---|---|---|---|
| | Time | Temp. | | Time | Temp. | |
| Same as Example I except no Titanium Dioxide. | Minutes 10 | °F. 100 | 1:3 methyl acetate: methanol | Minutes 15 | °F. 350 | Clear, nonopaque colours. |

Example V

Finely divided 20–80 mesh methylmethacrylate was used and resulting mass was treated according to the invention as indicated below:

| Colour Charge, Parts per 100 parts plastic | Spray | | Solvent, Composition | Drying | | Remarks |
|---|---|---|---|---|---|---|
| | Time | Temp. | | Time | Temp. | |
| Same as Example I | Minutes 13 | °F. 190 | 2:1 Methanol: Methyl Ethyl Ketone. | Minutes 12 | °F. 420 | Free-flowing and dry. Colour: excellent. |

My process enables the production of moulding powders of any desired colour or tint or opacity at a unit cost which is only a fraction of that entailed in using previously known processes, and which, by the use of the apparatus described, eliminates the necessity for the heavy and expensive capital equipment previously necessary for producing coloured moulding powders of similar characteristics.

What I claim as my invention is:

1. A method of colouring a charge of pulverized non-porous plastic material within an enclosure which comprises the steps of, tumbling the charge within the enclosure with particles of finely divided colouring material to form a substantially homogeneous mixture of the charge and the colouring material, and during the tumbling operation distributing throughout said mixture a finely divided low-boiling point organic liquid which has solvent power for at least the plastic material, to provide inter-adhesion of the plastic particles of the charge and the particles of the colouring material introduced, and lastly evaporating said low-boiling point organic liquid while tumbling continues and before consolidation of said plastic particles occurs by reason of the solvent action of the low-boiling point organic liquid.

2. The method of colouring a charge of pulverized non-porous plastic material as claimed in claim 1 in which the evaporating step is carried out by introducing a stream of gas into the enclosure.

3. The method of colouring a charge of pulverized non-porous plastic material as claimed in claim 1 in which the evaporating step is carried out by introducing a stream of gas into the enclosure at a temperature in the range between 250° and 400° F.

HENRY M. COLLINS.

REFERENCES CITED

The following references are of record in the file of this patent:

UNITED STATES PATENTS

| Number | Name | Date |
|---|---|---|
| 1,899,542 | Walsh | Feb. 28, 1933 |